United States Patent [19]

Imada et al.

[11] Patent Number: 4,551,310

[45] Date of Patent: Nov. 5, 1985

[54] CONTINUOUS VACUUM TREATING APPARATUS

[75] Inventors: Kiyoshi Imada, Omiya; Susumu Ueno, Ibaraki; Hirokazu Nomura, Ibaraki; Masaie Tohkai, Ibaraki; Yoshitada Hata, Matsudo; Kenichi Kato, Tokyo, all of Japan

[73] Assignees: Hitachi, Ltd.; Shin-Etsu Chemical Co., Ltd., both of Tokyo, Japan

[21] Appl. No.: 593,964

[22] Filed: Mar. 27, 1984

Related U.S. Application Data

[63] Continuation of Ser. No. 288,502, Jul. 30, 1981, abandoned.

[30] Foreign Application Priority Data

Jul. 30, 1980 [JP] Japan ............................ 55-103630

[51] Int. Cl.⁴ ..................... B01J 19/08; B01J 19/12; B05C 3/132
[52] U.S. Cl. ........................... 422/186.05; 118/718; 118/733; 118/50.1; 422/186.04; 422/186.25
[58] Field of Search ............. 422/186.05, 186, 186.04, 422/186.06, 186.21, 186.23, 186.25; 219/121 ED; 118/719, 720, 50, 718, 733, 50.1

[56] References Cited

U.S. PATENT DOCUMENTS

| | | | |
|---|---|---|---|
| 2,844,731 | 7/1958 | Plonsky et al. | 422/186.05 |
| 2,864,756 | 12/1958 | Rothacker | 422/186.05 |
| 3,043,715 | 7/1962 | Clough | 118/718 |
| 3,057,792 | 10/1962 | Frohlich | 422/186.05 |
| 3,067,119 | 12/1962 | Ramaika | 422/186.05 |
| 3,367,667 | 2/1968 | Allen | 118/733 |
| 3,507,763 | 4/1970 | McBride | 422/186.05 |
| 3,661,735 | 5/1972 | Drelich | 422/186.05 |
| 3,944,686 | 3/1976 | Froberg | 118/718 |
| 4,028,551 | 6/1977 | Thompson | 422/186.05 |
| 4,346,669 | 8/1982 | Hill | 118/718 |

*Primary Examiner*—Stephen J. Lechert, Jr.
*Assistant Examiner*—Howard J. Locker
*Attorney, Agent, or Firm*—Antonelli, Terry & Wands

[57] ABSTRACT

A continuous vacuum treating apparatus having a vacuum treating chamber for continuously treating the surface of a plastic molding under a vacuum, and at least one auxiliary vacuum chamber disposed at each of the upstream and downstream sides of the vacuum treating chamber. Each auxiliary vacuum treating chamber includes a pair of seal rolls contacting each other, means for effecting seals between the seal rolls and cases over the entire axial lengths of the rolls, and means for effecting seals between both end surfaces and the cases.

14 Claims, 7 Drawing Figures 4,551,310

CONTINUOUS VACUUM TREATING APPARATUS

This is a continuation of application Ser. No. 288,502 filed July 30, 1981 (now abandoned).

BACKGROUND OF THE INVENTION

1. Field of the Invention

The present invention relates to a continuous vacuum batch type treating apparatus system for effecting a continuous plasma treatment under a vacuum on various plastic moldings such as plastic films, plastic sheets and plasticcoated electric wires.

2. Description of the Prior Art

A batch type treating system of the aforementioned type has been proposed which includes a vacuum treating chamber in which a soft article such as a plastic film is treated to improve its surface property.

A so-called air-to-air type treating system for a vacuum evaporation or ion plating on a hard material such as metallic tape, metallic wire or the like has been proposed, wherein the hard material is introduced from the atmospheric side into the vacuum treating chamber through a preparatory vacuum chamber disposed at the upstream side of the vacuum treating chamber and, after the formation of metallic or alloy film on the article, the article is conveyed to the atomspheric side through a post vacuum chamber. In this air-to-air type system, the vaccum is maintained in the preparatory vacuum chamber and the post vacuum chamber by means of a water seal or a nozzle seal.

In the first-mentioned system, i.e. the batch type system, it is comparatively easy to obtain the sealing means. However, after the improvement of the surface property of the article is achieved to some extent, it is necessary to break the vacuum in the vacuum chamber. Namely, a repeated build up and breakage of the vacuum is necessary for the treatment of successive batches of article. This not only hinders the in-line mass-production but also degrades the characteristics of the treated products.

More specifically, in the case of articles containing a volatile content such as a plasticizer, e.g. a resin film of vinyl cholride system, the property of the article will be degraded if the latter is left for a long time within a vacuum. It is, therefore, desirable to treat a batch of articles in quite a short period of time of the order of several tens of seconds. It is quite difficult to effect a treatment in such a short period of time within a vaccum treating chamber.

The second-mentioned type of system can easily apply to the treatment of hard articles because it is comparatively easy to obtain seals of preparatory vacuum chamber and post vacuum chamber without the fear of damaging of the surfaces of articles or cutting of the same. This air-to-air system, however, can hardly apply to treatment of soft articles because it is extremely difficult to achieve an effective seal for the preparatory vacuum chamber and the post vacuum chamber without fear of damaging or cutting of the article.

SUMMARY OF THE INVENTION

Object of the Invention

Accordingly, an object of the invention is to provide a continuous vacuum treating apparatus capable of maintaining a good seal for a preparatory vacuum chamber and a post vacuum chamber to ensure a good reforming characteristic in the surface treatment, as well as high adaptability to a mass-production.

Another object of the invention is to improve the durability of various parts constituting the preparatory and post vacuum chambers, such as seal rolls, ripple members and side pieces.

To these ends, according to the invention, a continuous vacuum treating apparatus is provided having a vacuum treating chamber, at least one preparatory vacuum chamber disposed at the upstream side of the vacuum treating chamber, and at least one post vacuum chamber disposed at the downstream side of the vaccum treating chamber, wherein each of the preparatory vacuum chamber and the post vacuum chamber is composed of a pair of seal rolls, with means being provided for effecting a seal between the each seal roll and a case in the axial direction of the roll, and means for effecting a seal between both ends of each roll and the case.

DESCRIPTION OF THE PREFERRED EMBODIMENTS

Figure 1:
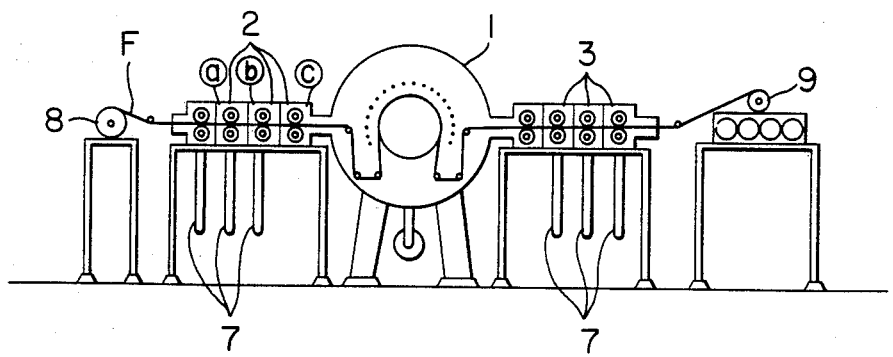
FIG. 1 is a schematic view of a continuous treating apparatus constructed in accordance with an embodiment of the invention.
Figure 2:
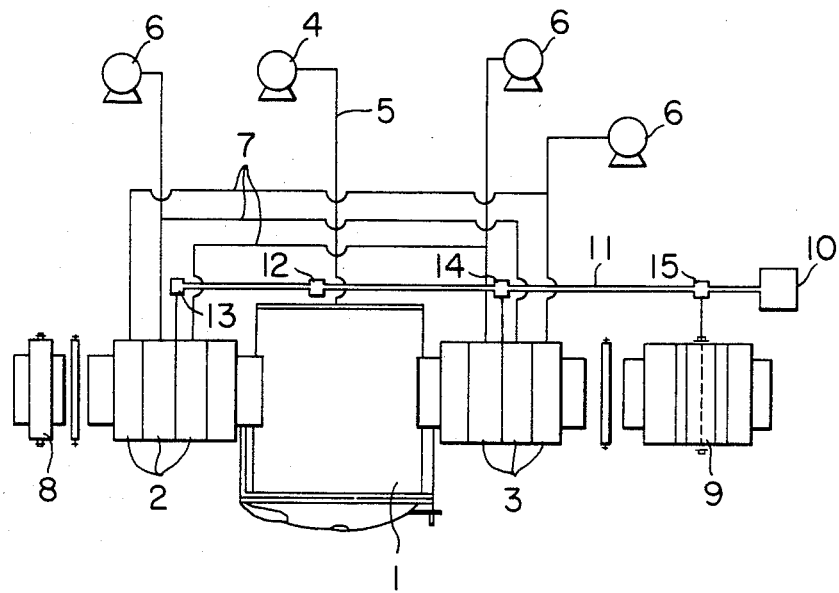
FIG. 2 is a schematic plan view of the apparatus shown in FIG. 1.

Referring now to the drawings wherein like reference numerals are used throughout the various views to designate like parts and, more particularly, to FIGS. 1 and 2, a continuous vacuum treatng apparatus in accordance with the invention has a vacuum treating chamber 1 in which a soft article F such as a plastic film of, for example, vinyl chloride is subjected to a continuous plasma treatment under a vacuum. A plurality of auxiliary vacuum chambers 2 are arranged at the upstream side of the vacuum treating chamber 1, as viewed in the direction of movement of the article to be treated. Similarly, a plurality of auxiliary vacuum chambers 3 are disposed at the downstream side of the vacuum treating chamber 1. A vacuum pump 4 is connected through an evacuation pipe 5 to the vacuum treatng chamber 1 to evacuate the latter to a level of $10^{-2}$ Torr. A pluarlity of vacuum pumps 6 are connected, as will be clearly understood from FIG. 2, to successive auxiliary vacuum chambers 2 or 3 at each side of the vacuum treating chamber 1 through evacuation pipes 7. The arrangement is such that a vacuum of progressively decreasing levels is established in the successive auxiliary vacuum chambers 2 of the upstream side, while a vacuum of progressively increasing levels are formed in successive vacuum chambers 3 of the downstream side. The levels of vacuum established in these auxiliary vacuum chambers 2 or 3, needless to say, are intermediate between the atmospheric pressure and the vacuum generated in the vacuum treating chamber 1.

The article F to be treated is conveyed continuously from a pay-off device 8 into the vacuum treating chamber 1 via the successive auxiliary vacuum chambers 2, and is subjected to a vacuum plasma treatment in the vacuum treating chamber 1. The article is then taken out from the vacuum treating chamber 1 and continuously taken-up by a take-up device 9 via the successive auxiliary vacuum chambers 3. A driving motor 10 delivers power to the vacuum treating chamber 1, auxiliary vacuum chambers 2, 3 and the take-up device 9, through a line shaft 11 and stepless transmissions 12, 13, 14 and 15. The speeds of driving system in the vacuum treating chamber 1, auxiliary vacuum chambers 2, 3 and the take-up device 9 are adjustable by means of the respective transmissions 12, 13, 14 and 15.

Figure 3:
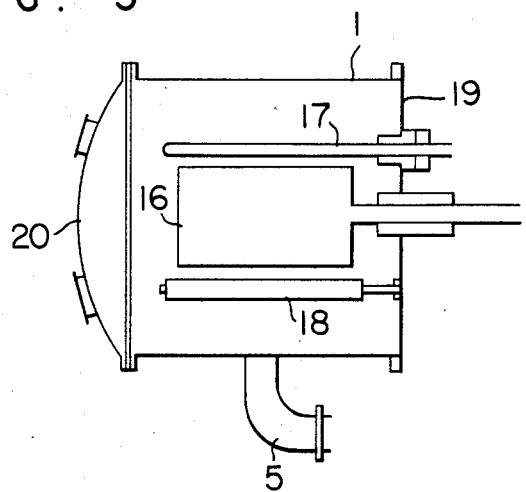
FIG. 3 is a schematic side elevational view of a vacuum treating chamber of the apparatus shown in FIG. 1.

Referring now to FIG. 3, the vacuum treating chamber 1 is composed of a drum-shaped cathode 16, a plurality of anodes 17 arranged around the cathode 16 and a guide roller 18 for guiding the article F to be treated. The cathode 16, anodes 17 and the guide roller 18 are cantilevered by one side wall 19, while the other side wall 20 constitutes a door which can be opened to provide access to the interior of the vacuum treating chamber 1.

Figure 5:
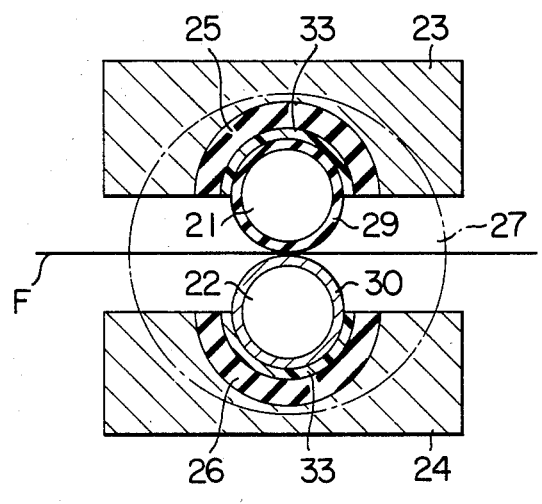
FIG. 5 is a cross-sectional view taken along the line V—V of FIG. 4.
Figure 4:
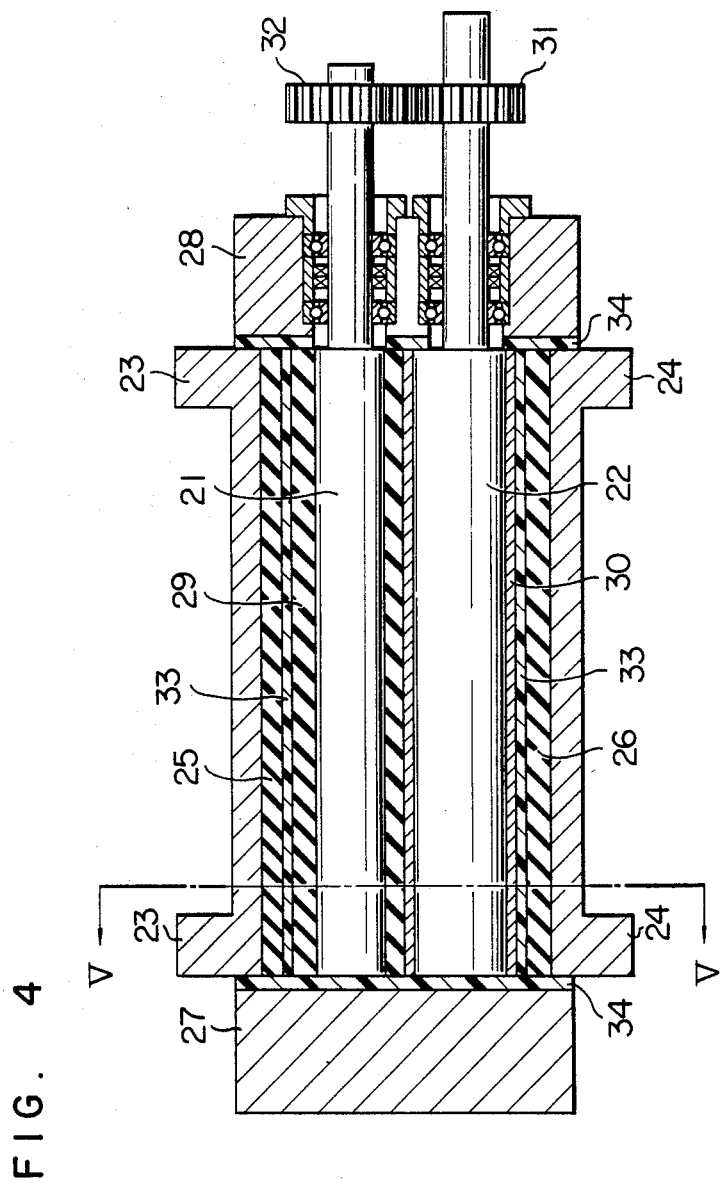
FIG. 4 is a cross-sectional view of a sealing means for an auxiliary vacuum chamber in the apparatus shown in FIG. 1.

FIGS. 4 and 5 shows the construction of each of the auxiliary chambers 2 and 3 arranged at the upstream and downstream sides of the vacuum treating chamber 1. As will be seen from these figures, each auxiliary vacuum chamber 2, 3 is composed of various parts such as a pair of mutually contacting upper and lower seal rolls 21, 22, upper and lower cases 23, 24, upper and lower roll support members 25, 26, left and right side pieces 27, 28 and so forth.

To explain in more detail, referring to FIGS. 4 and 5, the upper seal roll 21 has a core made of a metal such as iron and an elastic surface layer 29 of a rubber such as nitrile rubber fixed to the surface of the iron core, while the lower seal roll 22 has a core of a metal such as iron and a hard layer formed on the surface of the iron core such as a chrominum-plating layer 30. The elastic surface layer of the upper roll 21 may be constituted by a silicon rubber layer or an urethane rubber layer fixed to the iron core. It is also possible to use an alloy steel as the material of the lower seal roll 22. Although the lower seal roll 22 is illustrated as having double layers, i.e. the core metal layer and the hard surface layer, needless to say, the lower seal roll 22 may be composed of a single hard metallic material.

The upper and lower seal rolls 21, 22 are rotatably supported at their both ends by the side pieces 27, 28. The driving power is transmitted from the lower seal roll 22 to the upper seal roll 21 through the medium of meshing gears 31, 32.

The upper roll support member 25 is made of an metallic material and is attached to the upper case 23 in such a manner as to oppose to the outer periphery of the upper seal roll 21. A film 33 of a low friction coefficient such as fluororesin is formed by baking on the surface of the upper roll support member. Also, fluororesin film 34 or ceramic resin film of low friction coefficient is formed by baking on the portions of the side pieces 27, 28 opposing to the axial ends of the upper and lower seal rolls 21, 22.

Figure 6:
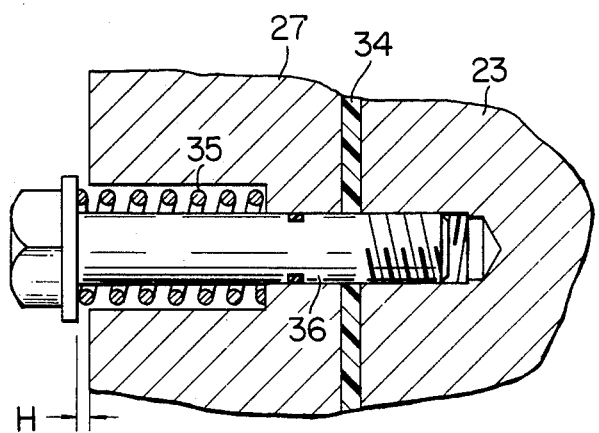
FIG. 6 is a cross-sectional detail view, on an enlarged scale of the manner of attaching pressure adjusting member in a portion of the apparatus constructed in accordance with the invention.

As shown in FIG. 6 a pressure adjusting device is provided for adjusting the pressure at which the side piece 27 is pressed against the axial ends of the upper and lower seal rolls 21, 22 and the upper and lower cases 23, 24. The pressure adjusting device includes various members such as an elastic member such as a coiled spring 35, disposed in the side piece 27, and a tightening member such as a bolt 36 for pressing the side piece 27 against the ends of the upper and lower seal rolls 21, 22 and the upper and lower cases 23, 24.

The pressing force of the side piece 27 is limited by the gap H between the side piece 27 and the bolt 36.

In the case where the pressure adjusting device is disposed only at one side of the seal rolls and the cases, the side piece 28 arranged at the other side of the seal rolls and cases is directly attached to the upper and lower cases 23, 24.

In the auxiliary vacuum chambers 2, 3 having the above-described construction, the seal between the upper seal roll 21 and the lower seal roll 22, through which the material F to be treated is passed, is achieved by pressing the rubber of the elastic surface layer 29 of the upper seal roll 21 against the lower seal roll 21 through the medium of the article F to be treated, in such a manner as to deflect the elastic surface layer 29 of the upper seal roll 21.

Also, the seal between the upper and lower seal rolls 21, 22 and the upper and lower cases 23, 24 is achieved by bringing the upper and lower roll support members 25, 26 into contact with the upper and lower seal rolls 21, 22.

The seal between the upper and lower seal rolls 21, 22 and the side pieces 27, 28 is achieved by pressing the side pieces 27, 28 onto the upper and lower cases 23, 24 by means of the pressure adjusting device.

According to this arrangement, the frictional force acting between the upper and the lower seal rolls 21, 22, as well as the sliding resistance, is decreased to improve not only the durability of the upper and lower seal rolls 21, 22 but also the sealing characteristic between the upper and lower seal rolls 21, 22.

In addition, as the upper and lower seal rolls 21, 22 are made to contact with the upper and lower roll support members 25, 26, the frictional force acting between the lower roll 22 and the lower roll support member 26 is reduced and the sliding resistance is decreased to ensure a remarkable improvement in the durability of the lower roll support member 26, not to mention the improvement in the durability of the upper seal roll 21 and the upper roll support member 25.

Furthermore, since the pressing force of the side piece 27 is adjusted by the bolt 36 of the pressure adjusting device through the medium of the coiled spring 35, in accordance with minute axial displacement of the upper and lower seal rolls 21, 22, the upper and lower seal rolls 21, 22 are correctly located in the axial direction and the durability of the side pieces 27, 28 is improved while attaining a higher sealing effect between both axial ends of the seal rolls 21, 22 and opposing side pieces 27, 28.

The upper and lower seal rolls 21, 22 are drivingly connected to each other through the medium of gears 31, 32 attached to the ends of shafts carrying these rolls. Therefore, the undesirable idling or slipping of the upper seal roll 21 is provided and the loss of power is decreased, even when the friction resistance between the upper seal roll 21 and the upper roll support member 25 or between the upper seal roll 21 and the side pieces 27, 28 is increased.

Although in the described embodiment the pressure adjusting device is provided only at one axial end of the seal roll, this arrangement is not exclusive and the pressure adjusting device may be disposed at each axial end of the seal rolls 21, 22.

Figure 7:
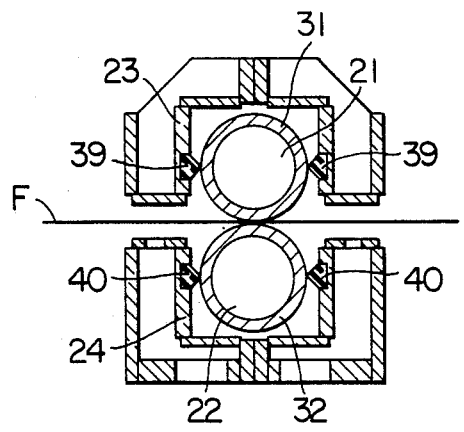
FIG. 7 is a cross-sectional view similar to that of FIG. 5, showing another example of the sealing means for the auxiliary vacuum chamber of the invention.

FIG. 7 provides another example of a seal means for providing a seal between the seal roll and the case and, according to this figure, ripple members 39, 40 are secured to the upper and lower cases 23, 24 and extend in the axial direction of the upper and lower seal rolls 21, 22 to make a linear contact with the peripheral surfaces of the rolls 21, 22. The ripple members 39, 40 are made of an elastic material such as nitrile rubber, and is coated at their surfaces with a material having a low friction coefficient such as fluororesin formed by baking.

By arranging the ripple members 39, 40 making linear contact with a part of the outer peripheral surface of each roll 21, 22 over the entire axial length of the latter, it is possible to obtain an effective seal between the seal roll and the case over the entire axial length of the roll. In addition, since the frictional force between the upper and lower seal rolls 21, 22 and the ripple members 39, 40 is remarkably decreased, the durability of the seal rolls is considerably improved.

The continuous vacuum treating apparatus of the invention, having the construction heretofore described, operates in the following manner.

As the vacuum pumps 4 and 6 are started, the vacuum treating chamber 1 and the auxiliary vacuum chambers 2, 3 are evacuated to the desired levels of vacuum. Accordingly, a higher vacuum, i.e. a lower absolute pressure, is established in the vacuum treating chamber 1 than in the auxiliary vacuum chambers 2, 3. Then, the driving systems of the drum-shaped cathode 16, upper and lower seal rolls 21, 22 of the auxiliary vacuum chambers 2, 3 and the take-up device 9 are started by means of the motor 10 through respective transmissions 12, 13, 14 and 15. In this state, the article F to be treated, e.g. a film of a vinyl chloride system resin, is continuously fed from the pay-off device 8 of the atmospheric side into the vacuum treating chamber 1 through the gap between the upper and lower seal rolls 21, 22 of the auxiliary vacuum chamber 2. Within the vacuum treating chamber, a plasma treatment is effected on the article F to be treated by a plasma discharge generated between the cathode 16 and the anode 17. The article F thus treated by the plasma is then conveyed to the outside of the vacuum treating chamber 1 and taken-up by the take-up device 9 on the atmospheric side, passing through the gap between the upper and lower seal rolls 21, 22 of the auxiliary vacuum chamber 3.

Thus, the article F is treated by the plasma in quite a short period of stay within the vacuum treating chamber 1, so that the undesirable escape of volatile content such as plasticizer in the vinyl chloride resin film is avoided to ensure a good transformed property on the surface of the article F.

The following table shows the levels of vacuum measured in the vacuum chamber 1 and the auxiliary vacuum chambers a, b, c shown in FIG. 1, in the state of continuous feed of the article F, in order to confirm the sealing effect in the continuous vacuum treating apparatus of the invention.

TABLE

| time elapsed | 5 min. | 10 min. | 15 min. | 20 min. |
| --- | --- | --- | --- | --- |
| measurement point | | | | |
| auxiliary vacuum chamber (a) | 20.0 Torr. | 10.5 Torr. | 10.0 Torr. | 10.0 Torr. |
| auxiliary vacuum chamber (b) | $700 \times 10^{-3}$ | $140 \times 10^{-3}$ | $127 \times 10^{-3}$ | $125 \times 10^{-3}$ |
| auxiliary vacuum chamber (c) | $500 \times 10^{-3}$ | $130 \times 10^{-3}$ | $127 \times 10^{-3}$ | $125 \times 10^{-3}$ |
| vacuum treating chamber | $150 \times 10^{-3}$ | $25 \times 10^{-3}$ | $23 \times 10^{-3}$ | $22 \times 10^{-3}$ |

From the table shown above, it will be seen that the levels of the vacuum in the vacuum treating chamber 1 and respective auxiliary vacuum chambers 2 are gradually increased, i.e. the levels of the absolute pressure is decreased, as the time elapses. It will be seen also that such a pressure gradient as to decrease the absolute pressure in a stepped manner toward the vacuum treating chamber 1 is established through successive auxiliary vacuum chambers a, b, c. This clearly shows that the desired sealing effect is achieved in the continuous vacuum treating apparatus of the invention.

As will be understood from the foregoing description, the present invention provides in air-to-air type continuous vacuum treating apparatus capable of achieving a high sealing effect in the auxiliary vacuum chambers, while attaining a good reforming characteristic in the surface treatment of the plastic moldings to be treated, as well as remarkable improvement of the productivity. These effects are remarkable particularly when the article to be treated is a soft one such as a film of resin of vinyl chloride system.

What is claimed is:

1. A continuous vacuum treating apparatus adapted to treat a flexible plastic film, the apparatus comprising: a vacuum treating chamber, at least one auxiliary vacuum chamber disposed at each of an upstream and a downstream side of said vacuum treating chamber, the auxiliary vacuum chambers each including a case and a pair of opposed seal rolls arranged for pressing said film between the nip of said rolls, one of said seal rolls in wholly made of a metal while the other of said seal rolls has a metallic core and an elastic member on an outer surface of said metallic core, means for effecting seals between said seal rolls and said case along an entire axial length of said rolls including ripple members constituted by elastic members coated with a film of a material having a low friction coefficient, means for effecting seals between both end surfaces of said seal rolls and said case including side pieces for contacting both ends of said seal rolls and at least a pressure adjusting means for pressing one of said side plates against associated end surfaces of said seal rolls, and said apparatus further comprising means for driving at least one of said seal rolls of each of said pairs of seal rolls of the auxiliary vacuum chambers, said driving means including means for adjusting the driving speed of the seal rolls of said upstream auxiliary vacuum chamber and the seal rolls of said downstream auxiliary vacuum chamber with respect to each other, and vacuum pump means for evacuating said vacuum treating chamber and said auxiliary vacuum chambers.

2. A continuous vacuum treating apparatus as claimed in claim 1, wherein said side pieces are coated at their portions for contacting said seal rolls with a film of a material having a low friction coefficient.

3. A continuous vacuum treating apparatus as claimed in claim 2, wherein said film of a material having a low friction coefficient is made of a fluororesin.

4. A continuous vacuum treating apparatus as claimed in claim 1, wherein said seal rolls are axially located by means of said side pieces.

5. A continuous vacuum treating apparatus as claimed in claim 1, wherein said pressure adjusting means includes a resilient member and a tightening member.

6. A continuous vacuum treating apparatus as claimed in claim 5, wherein said resilient member is a spring.

7. A continuous vacuum treating apparatus as claimed in claim 1, wherein a single pressure adjusting device is provided for pressing one of said side pieces to be associated end surfaces of said seal rolls.

8. A continuous vacuum treating apparatus as claimed in claim 1, wherein pressure adjusting means are provided for pressing both side pieces to respective end surfaces of said seal rolls.

9. A continuous vacuum treating apparatus for treatment of non-metallic material such as a flexible plastic film comprising: a vacuum treating chamber, and at least one auxiliary vacuum chamber disposed at each of an upstream and a downstream side of said vacuum treating chamber, the auxiliary vacuum chambers each including a case and a pair of opposed seal rolls arranged for pressing said material between the nip of said rolls, means for effecting seals between said seal rolls and said case including roll support members for supporting and contacting said seal rolls along their entire axial length, and means for effecting seals between both end surfaces of said seal rolls and said case, and wherein said apparatus further comprises means for driving at least one of the seal rolls of each of said pairs of seal rolls of the auxiliary vacuum chambers, and said driving means including means for adjusting the driving speed of the seal rolls of the upstream auxiliary vacuum chamber and the downstream auxiliary vacuum chamber with respect to each other, and vacuum pump means for evacuating said vacuum treating chamber and said auxiliary vacuum chambers.

10. A continuous vacuum treating apparatus as claimed in claim 9, wherein said roll supporting member is constituted by an elastic member coated with a film of a material having a low friction coefficient.

11. A continuous vacuum treating apparatus as claimed in claim 10, wherein said film of a material having a low friction coefficient is made of a fluororesin.

12. A continuous vacuum treating apparatus for treatment of a non-metallic material such as a flexible plastic film comprising: a vacuum treating chamber, and at least one auxiliary vacuum chamber disposed at each of an upstream and a downstream side of said vacuum treating chamber, the auxiliary vacuum chambers each including a case and a pair of opposed seal rolls arranged for pressing said film between the nip of said rolls, means for effecting seals between said seal rolls and said case along an entire axial length of said rolls, and means for effecting seals between both end surfaces of said seal rolls and said case, said apparatus further comprising means driving at least one of the seal rolls of each of said pairs of seal rolls of the auxiliary vacuum chambers, said driving means including means for adjusting the driving speed of the seal rolls of the upstream auxiliary vacuum chamber and the downstream auxiliary vacuum chamber with respect to each other and vacuum pump means for evacuating said vacuum treating and said auxiliary vacuum chambers.

13. A continuous vacuum treating apparatus according to claim 12, wherein said auxiliary vacuum chambers are formed between two pairs of said opposed seal rolls arranged in a transporting direction of said material.

14. A continuous vacuum treating apparatus as claimed in claim 12, wherein both of said seal rolls of each of said pairs of seal rolls are driven by power.

* * * * *